(12) United States Patent
Yajima et al.

(10) Patent No.: US 8,421,564 B2
(45) Date of Patent: Apr. 16, 2013

(54) ELECTROMAGNETIC ACTUATOR

(75) Inventors: Hisashi Yajima, Tsukuba (JP); Nobuhiro Fujiwara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 31 days.

(21) Appl. No.: 12/871,492

(22) Filed: Aug. 30, 2010

(65) Prior Publication Data

US 2011/0050375 A1    Mar. 3, 2011

(30) Foreign Application Priority Data

Sep. 1, 2009    (JP) ................................ 2009-202120
Jul. 13, 2010   (JP) ................................ 2010-158543

(51) Int. Cl.
*H01F 7/00*   (2006.01)

(52) U.S. Cl.
USPC .......... 335/229; 335/222; 335/230; 335/279; 335/281; 310/12

(58) Field of Classification Search .......... 335/221–222, 335/229–237, 254, 279, 281, 296, 302–306; 310/12
See application file for complete search history.

(56) References Cited

U.S. PATENT DOCUMENTS

| | | | | |
|---|---|---|---|---|
| 3,077,444 A | * | 2/1963 | Hoh ........................ | 204/192.2 |
| 3,177,384 A | * | 4/1965 | Montagu .................... | 310/12.15 |
| 4,075,589 A | * | 2/1978 | Braillon ..................... | 335/286 |
| 5,698,910 A | * | 12/1997 | Bryant et al. ............... | 310/12.04 |
| 6,917,126 B2 | * | 7/2005 | Tsuboi et al. ............... | 310/12.04 |
| 6,960,847 B2 | * | 11/2005 | Suzuki et al. ................ | 310/14 |
| 7,683,749 B2 | | 3/2010 | Yajima et al. | |
| 7,745,963 B2 | * | 6/2010 | Jenny ........................ | 310/12.01 |
| 7,770,700 B2 | | 8/2010 | Yajima et al. | |
| 8,222,777 B2 | * | 7/2012 | Loussert et al. ........... | 310/68 B |
| 2006/0114090 A1 | * | 6/2006 | Yajima et al. ............... | 335/229 |
| 2006/0226713 A1 | * | 10/2006 | Lehr et al. .................. | 310/12 |
| 2006/0237268 A1 | * | 10/2006 | Yajima et al. ............... | 188/164 |

FOREIGN PATENT DOCUMENTS

| | | | |
|---|---|---|---|
| JP | 56053570 A | * | 5/1981 |
| JP | 62-242126 | | 10/1987 |
| JP | 2006-187192 | | 7/2006 |
| JP | 2006-307882 | | 11/2006 |

* cited by examiner

*Primary Examiner* — Mohamad Musleh
(74) *Attorney, Agent, or Firm* — Oblon, Spivak, McClelland, Maier & Neustadt, L.L.P.

(57) ABSTRACT

The electromagnetic actuator is a linear electromagnetic actuator in which the relative position between a slide table that supports permanent magnets thereon and a guide rail that supports a coil, which is arranged in confronting relation to the permanent magnets, is displaced by means of a thrust force generated by a current flowing through the coil. The coil is disposed on the guide rail through a low coercive force magnetizable material body, the coercive force of which is lower than a predetermined value. Consequently, generation of residual magnetization can be suppressed, and an influence on the thrust force caused by such residual magnetization can also be suppressed.

11 Claims, 11 Drawing Sheets

ELECTROMAGNETIC ACTUATOR

CROSS-REFERENCE TO RELATED APPLICATION

This application is based upon and claims the benefit of priority from Japanese Patent Applications No. 2009-202120 filed on Sep. 1, 2009 and No. 2010-158543 filed on Jul. 13, 2010, of which the contents are incorporated herein by reference.

BACKGROUND OF THE INVENTION

1. Field of the Invention

The present invention relates to an electromagnetic actuator that uses a coil and permanent magnets.

2. Description of the Related Art

A linear electromagnetic actuator is known, which enables generation of magnetic saturation in a yoke to be suppressed, by forming first and second projections that face toward a guide rail from both sides of a slide table (see, Japanese Laid-Open Patent Publication No. 2006-187192).

Because it is required for the guide rail to have significant hardness, the hardness of the guide rail is preserved to a large degree by the materials used, and by heat treatment. However, when the guide rail is fabricated with large hardness, the coercive force as well as hysteresis in the guide rail also becomes greater. As a result, when the permanent magnets move over the guide rail accompanying movement of the slide table, residual magnetization is generated in the guide rail. From the effect of such residual magnetization, braking forces are generated in a direction opposite to the direction of movement of the permanent magnets. As a result of generation of such braking forces, the thrust force in the movement direction becomes smaller. Further, when positioning of the slide table is controlled, the coercive force causes oscillations, and accuracy in positioning of the slide table is deteriorated.

SUMMARY OF THE INVENTION

The present invention has been made in consideration of the aforementioned disadvantages, and has the object of providing an electromagnetic actuator that can suppress the influence of residual magnetization on thrust force, and which further enables accuracy in positioning of a slide table to be assured.

To achieve the aforementioned objects, the present invention is characterized by an electromagnetic actuator, which causes relative positional displacement between a first yoke supporting a permanent magnet and a second yoke supporting a coil arranged to confront the permanent magnet, by means of a thrust force that is generated due to a current that flows through the coil, and wherein the coil is disposed on the second yoke through a low coercive force magnetizable material body, the coercive force of which is lower than a predetermined value.

A first projection and a second projection may be formed on opposite end sides of the second yoke facing toward the first yoke and projecting along a displacement direction, and the first yoke may be disposed between the first projection and the second projection.

A third projection and a fourth projection may be formed on opposite end sides of the first yoke facing toward the second yoke and projecting along a displacement direction, such that the third projection and the fourth projection are separated from the second yoke. A first guide member may be interposed between the third projection and the second yoke, and a second guide member may be interposed between the fourth projection and the second yoke.

The first projection and the second projection may be formed on opposite end sides of the second yoke facing toward the first yoke and projecting along the third projection and the fourth projection. The first guide member may be interposed between the first projection and the third projection, and the second guide member may be interposed between the second projection and the fourth projection.

The first yoke and the second yoke may be arranged in confronting relation to each other, such that the permanent magnet is positioned on a side of the first yoke that faces the second yoke, and the coil is positioned on a side of the second yoke that faces the first yoke.

The coil may comprise an open center coil formed by an insulating material.

At least one of the first projection and the second projection of the first yoke and the second yoke may be subjected to heat treatment in order to impart hardness thereto.

On a surface of the second yoke that faces toward the permanent magnet, at least a region thereof that is magnetized by the permanent magnet may comprise a region on which heat treatment to impart hardness is not implemented.

The low coercive force magnetizable material body may comprise at least one of pure iron, magnetic steel, low-carbon steel, a cobalt alloy, and an amorphous alloy.

The low coercive force magnetizable material body may be formed in a plate-like shape.

A thickness of the low coercive force magnetizable material body may be determined corresponding to an allowable hysteresis value.

To achieve the aforementioned objects, the present invention further is characterized by an electromagnetic actuator, which causes relative positional displacement between a first yoke supporting a permanent magnet and a second yoke supporting a coil arranged to confront the permanent magnet, by means of a thrust force that is generated due to a current that flows through the coil, and wherein, on a surface of the second yoke that faces toward the permanent magnet, at least a region thereof that is magnetized by the permanent magnet comprises a region on which heat treatment to impart hardness is not implemented.

The surface of the second yoke that faces toward the permanent magnet may comprise a region on which heat treatment to impart hardness is not implemented.

A first projection and a second projection may be formed on opposite end sides of the second yoke facing toward the first yoke and projecting along a displacement direction. The first yoke may be disposed between the first projection and the second projection, and at least one of the first projection and the second projection may be subjected to heat treatment in order to impart hardness thereto.

A third projection and a fourth projection may be formed on opposite end sides of the first yoke facing toward the second yoke and projecting along the first projection and the second projection. The third projection and the fourth projection may be separated from the second yoke. A first guide member may be interposed between the first projection and the third projection, and a second guide member may be interposed between the second projection and the fourth projection.

The first yoke, or the third projection and the fourth projection of the first yoke, may be subjected to heat treatment in order to impart hardness thereto.

The heat treatment may comprise any one of high frequency hardening, carburizing and quenching, and vacuum hardening.

A plurality of rolling bodies may be included within the first guide member and the second guide member, at least a portion of the plurality of rolling bodies comprising first rolling bodies made of a magnetic material.

The first rolling bodies and second rolling bodies made of a non-magnetic material may be included within the first guide member and the second guide member, wherein the first rolling bodies and the second rolling bodies are disposed alternately along the displacement direction.

According to the present invention, since a low coercive force magnetizable material body is disposed between the coil and the second yoke, generation of residual magnetization can be suppressed. As the generation of residual magnetization is suppressed, the influence of the residual magnetization on thrust force is also suppressed. Consequently, since the first yoke can be moved accurately, it is possible to provide an electromagnetic actuator improved in accuracy in positioning of the first yoke.

Further, according to the present invention, since a region that is magnetized by a permanent magnet on a surface of the second yoke facing toward the permanent magnet is not subjected to a heat treatment for imparting hardness, generation of residual magnetization can be suppressed. As the generation of residual magnetization is suppressed, the influence of the residual magnetization on thrust force is also suppressed. Consequently, since the first yoke can be moved accurately, it is possible to provide an electromagnetic actuator improved in accuracy in positioning of the first yoke.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 5A to 5C are schematic views for explaining the principles by which braking forces are generated that impede the thrust force of a slide table, wherein FIG. 5A shows magnetic poles generated in a magnetizable material body at a time when a movable section is stopped, FIG. 5B shows magnetic poles generated in a magnetizable material body by movement of the movable section in the direction of an arrow B1 in a case where the coercive force of the magnetizable material body is small, and FIG. 5C shows magnetic poles generated in the magnetizable material body by movement of the movable section in the direction of the arrow B1 in a case where the coercive force of the magnetizable material body is large;

DESCRIPTION OF THE PREFERRED EMBODIMENTS

A preferred embodiment of an electromagnetic actuator according to the present invention shall be explained in detailed below with reference to the accompanying drawings. Concerning the present embodiment, an explanation shall be made in which the electromagnetic actuator of the present invention is applied to a linear electromagnetic actuator.

Figure 1:
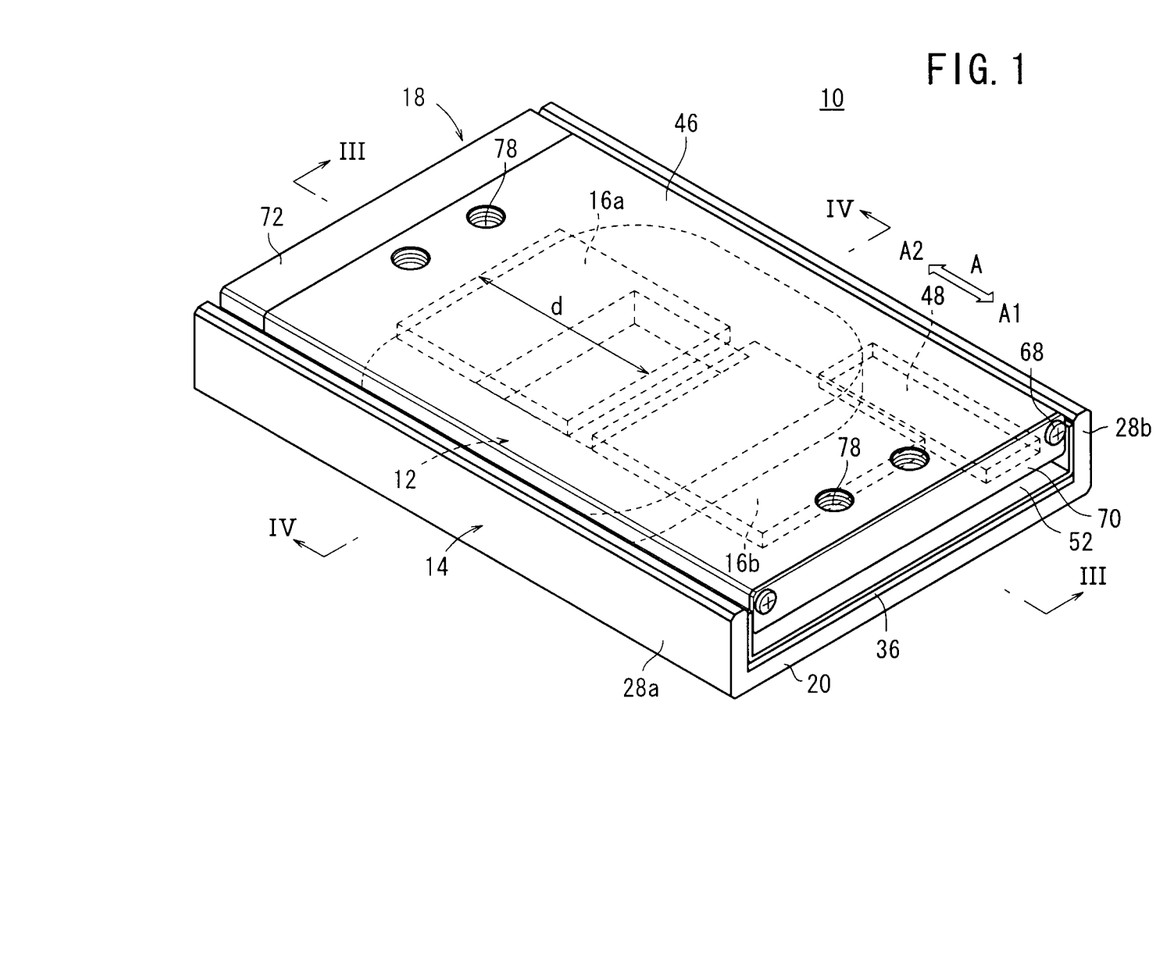
FIG. 1 is a perspective view of a linear electromagnetic actuator according to a present embodiment of the invention.
Figure 2:
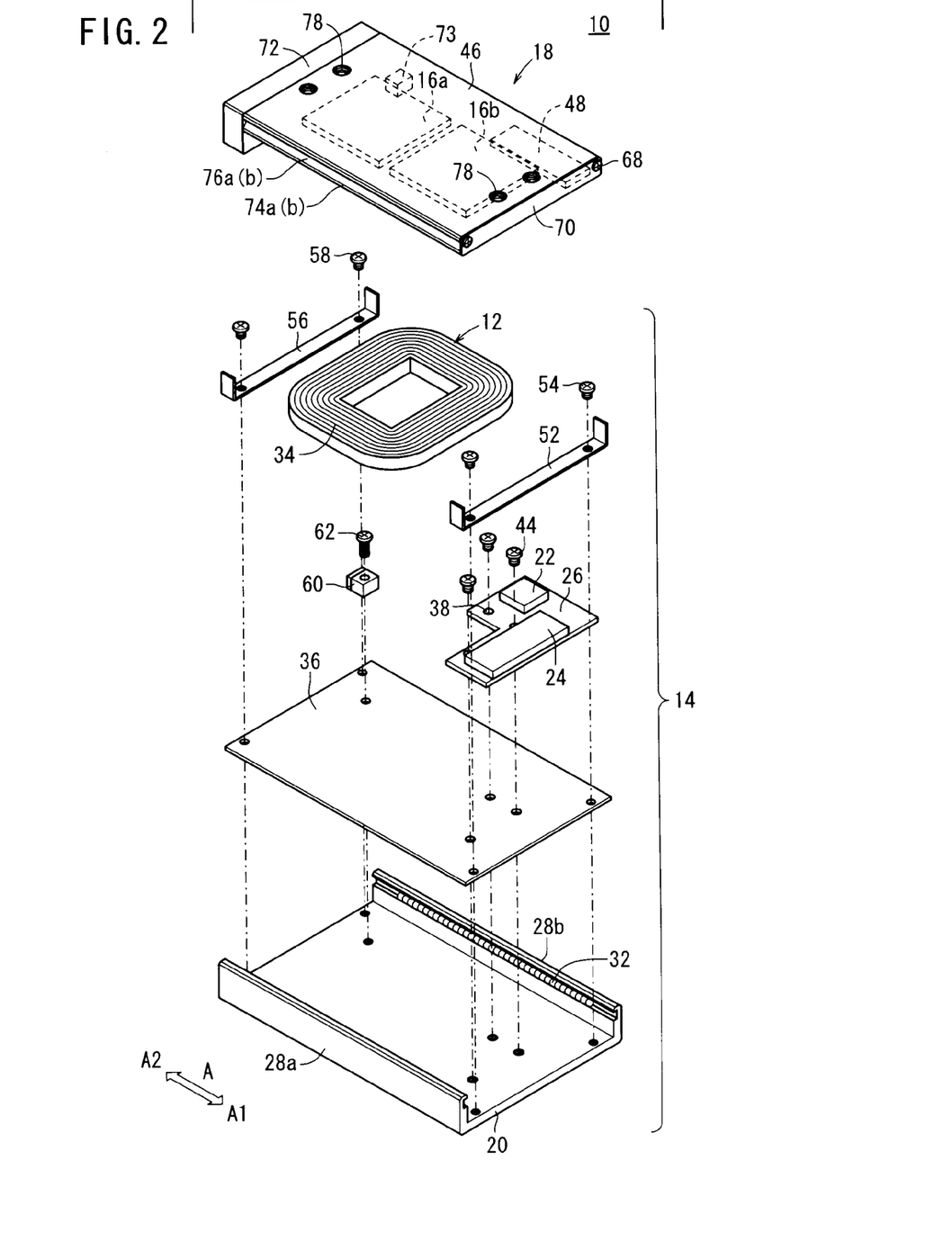
FIG. 2 is an exploded perspective view of the linear electromagnetic actuator shown in FIG. 1.
Figure 3:
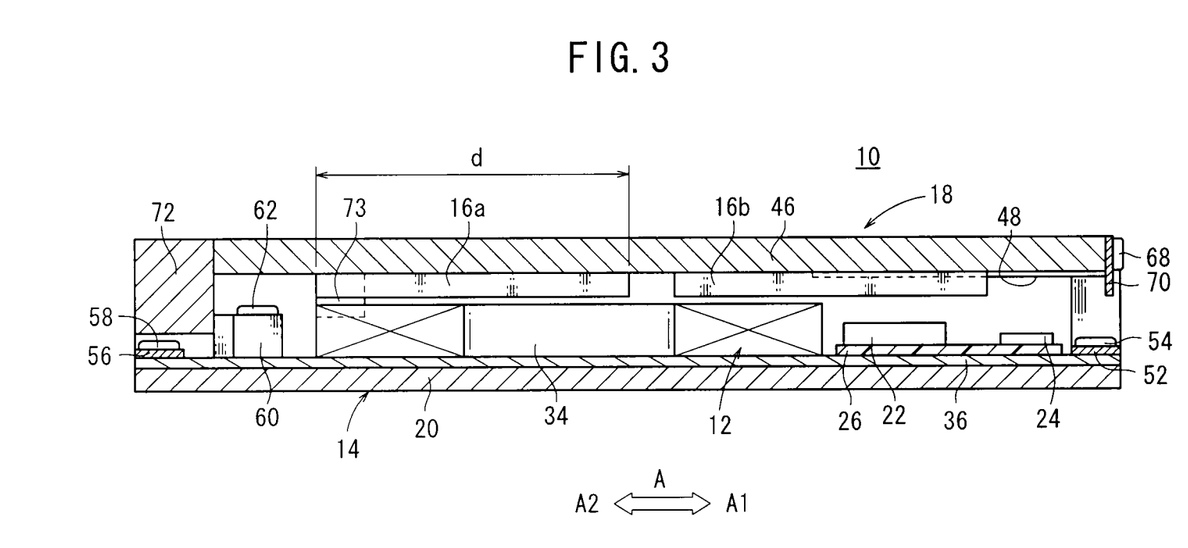
FIG. 3 is a cross sectional view taken along arrows III-III shown in FIG. 1.
Figure 4:
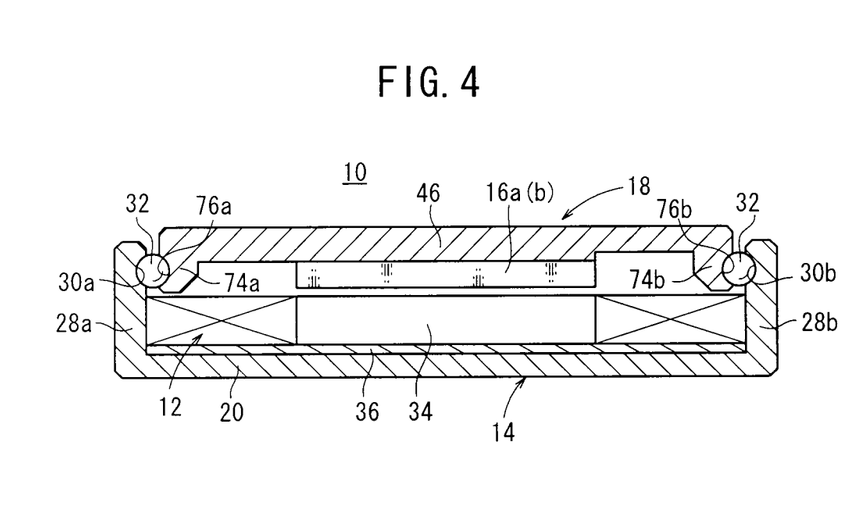
FIG. 4 is a cross sectional view taken along arrows IV-IV shown in FIG. 1.

FIG. 1 is a perspective view of a linear electromagnetic actuator 10 according to the present embodiment, FIG. 2 is an exploded perspective view of the linear electromagnetic actuator 10, FIG. 3 is a cross sectional view taken along arrows of FIG. 1, and FIG. 4 is a cross sectional view taken along arrows IV-IV of FIG. 1.

The linear electromagnetic actuator 10 is equipped with a fixed section 14 and a movable section 18 disposed in confronting relation to the fixed section 14. The fixed section 14 comprises a guide rail 20 (second yoke), a low coercive force magnetizable material body 36 having a coercive force smaller than a predetermined value (e.g., 500 A/m), a coil 12, a circuit substrate 26, and a stopper 60. The movable section 18 comprises a slide table 46 (first yoke), an elongate plate shaped member 70, an end block 72, two permanent magnets 16a, 16b, a scale 48, and a stopper 73.

The yokes, which are formed as the guide rail 20 and the slide table 46, may be formed from martensitic stainless steel (e.g., SUS440C or the like), carbon steel (e.g., S55C or the like), or chrome molybdenum steel (e.g., SCM415 or the like). Heat treatment in order to impart hardness thereto is implemented on the guide rail 20 and the slide table 46. For example, if the yokes are formed from (martensitic) stainless steel, the yokes are hardened by implementing a vacuum quenching and tempering treatment thereto. Further, if the yokes are formed from carbon steel, the yokes are hardened by implementing a high frequency quenching and tempering treatment thereto, and if the yokes are formed from chrome molybdenum steel, the yokes are hardened by implementing a carburizing quenching and tempering treatment thereto. Yokes that are formed from martensitic stainless steel, carbon steel, or chrome molybdenum steel develop a higher coercive force as a result of being subjected to heating treatment for hardening, and become magnetizable materials that exhibit a high coercive force. Over the entire guide rail 20 and slide table 46 are subjected to the heat treatment.

The guide rail 20 is U-shaped in cross section, and further supports thereon both the coil 12 and the low coercive force magnetizable material body 36. The low coercive force magnetizable material body 36 is disposed on the guide rail 20. The low coercive force magnetizable material body 36 may be formed from pure iron (SUY), or from magnetic steel. Pure iron is defined as iron that does not include any impurities therein, however, since it is difficult in practice to manufacture pure iron, iron in which the purity level thereof is higher than a predetermined value may be utilized. Further, the low coercive force magnetizable material body 36 may be formed in a plate-like shape. Moreover, the low coercive force magnetizable material body 36 may be formed from low-carbon steel, a nickel alloy such as permalloy or the like, a cobalt alloy such as permendur or the like, or an amorphous alloy.

The coil 12 is an open center coil form by winding conductive wire covered by an insulative layer, and molding it with an insulative material body 34 made of resin. The coil 12 is disposed at a roughly central portion on an upper surface of the low coercive force magnetizable material body 36.

An encoder 22 and an electronic circuit 24 are mounted on the circuit substrate 26, which is formed from a resin material. The circuit substrate 26 is disposed on the upper surface of the low coercive force magnetizable material body 36, on a side in the direction of the arrow A1 from the coil 12. The circuit substrate 26 is disposed on the low coercive force magnetizable material body 36 through screws 44, which are screw-inserted into holes 38 formed in the circuit substrate 26.

The electronic circuit 24 is connected respectively to the wire of the coil 12 and to the encoder 22. The electronic circuit 24 causes a current to flow through the wire based on a control signal from a non-illustrated external apparatus, and also outputs to the external apparatus electrical signals that are input thereto from the encoder 22. The encoder 22 is arranged so as to face toward a scale 48, which is disposed on a lower surface of the slide table 46.

The encoder 22 faces toward the scale 48 and illuminates the scale 48 with light, and further receives reflected light from the scale 48 as a result of the illuminated light. In the case that the movable section 18 is displaced in the direction of the arrow A (displacement direction), the reflected light amount varies, and therefore based on the light amount of the received reflected light, the displacement amount of the movable section 18 is calculated, and the calculation result is output as an electric signal to the electronic circuit 24. Although not shown in detail, the encoder 22 includes at least an illuminating section for illuminating light, a light receiving section for receiving light, and a displacement calculating section for calculating a displacement amount based on an electric load corresponding to the light received by the light receiving section.

On opposite sides of the guide rail 20, projections (first and second projections) 28a, 28b are formed to project from the base toward the movable section 18, and on inner sides of each of the projections 28a, 28b, guide grooves 30a, 30b are formed, which extend along the direction of the arrow A shown in FIGS. 1 through 3. A plurality of balls (first and second guide members) 32 are disposed as rolling bodies in the guide grooves 30a, 30b. In this case, the guide rail 20 is formed to be wider than the slide table 46 of the movable section 18, with the slide table 46 being arranged between the respective projections 28a, 28b of the guide rail 20. The wall thickness of the guide rail 20 and the projections 28a, 28b is formed to be thinner than a length d (see FIG. 3) in the direction of the arrow A of the permanent magnets 16a, 16b.

Moreover, the first and second guide members 32 may comprise a plurality of rolling bodies in the form of cylinders or columns.

On opposite end sides of the low coercive force magnetizable material body 36, cross sectionally U-shaped ball latch members 52, 56 which prevent the balls 32 from dropping out, are affixed respectively by screws 54, 58.

The stopper 60 is affixed to the upper surface of the low coercive force magnetizable material body 36 by a screw 62. When the movable section 18 is displaced in the direction of the arrow A1, the stopper 60 restricts further displacement of the movable section 18. More specifically, by abutment against a side surface of the end block 72 connected to the other end of the slide table 46, the stopper 60 prevents displacement toward the side of the arrow A1 direction of the guide rail 20 of the movable section 18. The end block 72 is affixed by unillustrated screws to the other end in the direction of the arrow A2 of the slide table 46. In FIGS. 1 to 3, the stopper 60 and the end block 72 abut against each other, and a condition occurs in which the movable section 18 is prevented from displacement in the direction of the arrow A1.

The slide table 46 is formed with a U-shape in cross section, with the width of the slide table 46 being set to be smaller than the width of the guide rail 20. On opposite side portions of the slide table 46, respective projections (third and fourth projections) 74a, 74b are formed, which project toward the fixed section 14 from the base thereof. The projections 74a, 74b are formed to project toward the guide rail 20 while being separated therefrom. On outer sides of each of the projections 74a, 74b, guide grooves 76a, 76b are formed, in which the balls 32 can be arranged along the direction of the arrow A. The slide table 46 and the guide rail 20 are connected to each other through the balls 32 (see FIG. 4).

More specifically, with the linear electromagnetic actuator 10, the guide rail 20 and the slide table 46 are arranged such that the guide grooves 76a, 76b and the guide grooves 30a, 30b are positioned approximately at the same height, and the plurality of balls 32 are accommodated as a linear guide of a limited length in the space that is formed by the guide grooves 76a, 76b and the guide grooves 30a, 30b. Under a guiding action by rotation of the balls 32, the movable section 18 is made displaceable in the direction of the arrow A with respect to the fixed section 14.

Roughly rectangular shaped permanent magnets 16a, 16b are arranged on a lower surface of the slide table 46 confronting the coil 12 at a substantially central portion in the widthwise direction of the slide table 46. Stated otherwise, the permanent magnets 16a, 16b are disposed on a side of the slide table 46 that faces the fixed section 14. The permanent magnets 16a, 16b are separated a predetermined distance from each other. Sizes of the permanent magnets 16a, 16b are set to be smaller than the size of the coil 12. Although in the drawings two permanent magnets 16a, 16b are shown, only one, or three permanent magnets may be provided. The plate shaped member 70 is affixed to an end portion in the direction of the arrow A1 of the slide table 46 through screws 68.

On opposite end sides of the slide table 46, a plurality of screw holes 78 are formed along the thickness direction thereof. The slide table 46 is capable of being affixed to another member by unillustrated screws, which are screw-inserted into each of the screw holes 78. On the other hand, on a side surface in the direction of the arrow A2 of the end block 72, unillustrated screw holes are formed along the thickness direction of the end block 72. By means of screws, which are screw-inserted into the screw holes, the end block can be affixed to another member.

The stopper 73 is disposed on a lower surface of the slide table 46 in the vicinity of the permanent magnet 16a. By abutment of the stopper 73 against a side surface in the direction of the arrow A1 of the stopper 60, displacement of the slide table 46 in the direction of the arrow A2 is prevented.

The ball latch members 52, 56, the stoppers 60, 73, the plate shaped member 70, the end block 72, and the screws 44, 54, 58, 62, 68 are constituted from non-magnetic materials. The balls 32 may be magnetic or non-magnetic. Further, magnetic balls 32 (first rolling bodies) and non-magnetic (e.g., resin material) balls 32 (second rolling bodies) may be arranged alternately along the direction of the arrow A.

In the linear electromagnetic actuator 10, in the case that the slide table 46 is displaced in the direction of the arrow A while being guided by the plurality of balls 32, although the balls 32 generally rotate in the same direction, at surfaces where each of adjacent balls 32 come into contact with each other, the balls 32 tend to rotate in opposite directions. Consequently, high frictional resistance is generated between each of the balls 32 and positional slippage of the balls 32 occurs. Thus, there is a possibility that the slide table 46 cannot be displaced smoothly. Accordingly, by arranging magnetic balls 32 and non-magnetic balls 32 alternately, frictional resistance between adjacent balls 32 is suppressed, and the slide table 46 can be displaced smoothly.

Further, among each of the balls 32, by making at least a portion of the balls 32 from a magnetic material, generation of leaking magnetic flux in spaces between the projections 28a, 28b and the projections 74a, 74b can be suppressed.

In the linear electromagnetic actuator 10 having the structure described above, by changing the direction of current that energizes the coil 12, in accordance with the direction of current that flows through the coil 12 and the magnetic flux generated in the linear electromagnetic actuator 10, a thrust force (Lorentz force) in the direction of the arrow A is generated in the coil 12 based on Fleming's left-hand rule. By means of such a thrust force, the slide table 46 (i.e., the movable section 18) is displaced. During displacement of the slide table 46, when residual magnetization is generated in the guide rail 20, braking forces are generated which impede the thrust force of the slide table 46. Below, the principles behind generation of such braking forces shall be explained in greater detail.

Figure 5A:
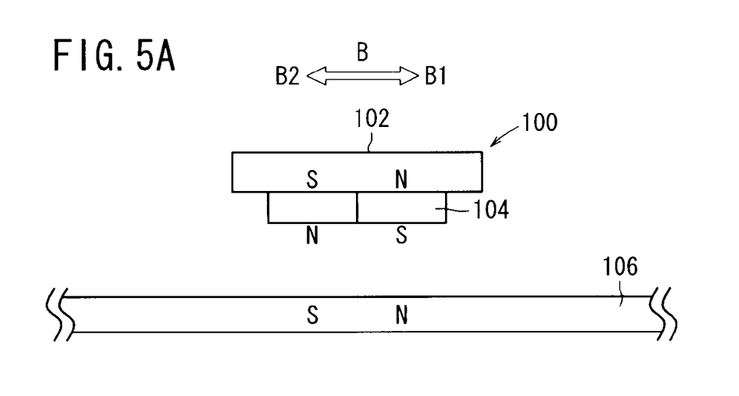
Figure 5B:
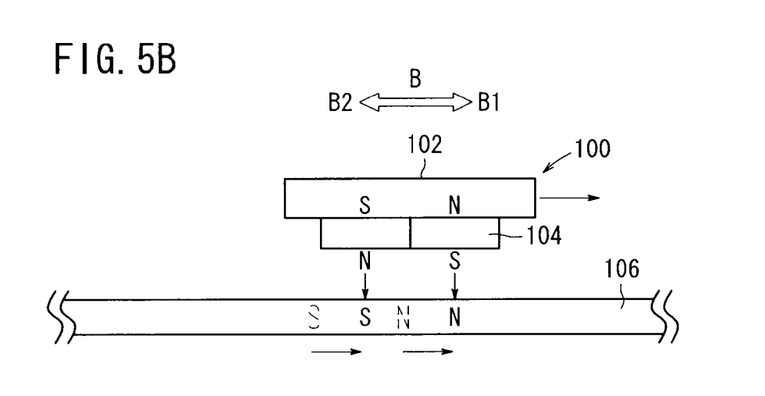
Figure 5C:
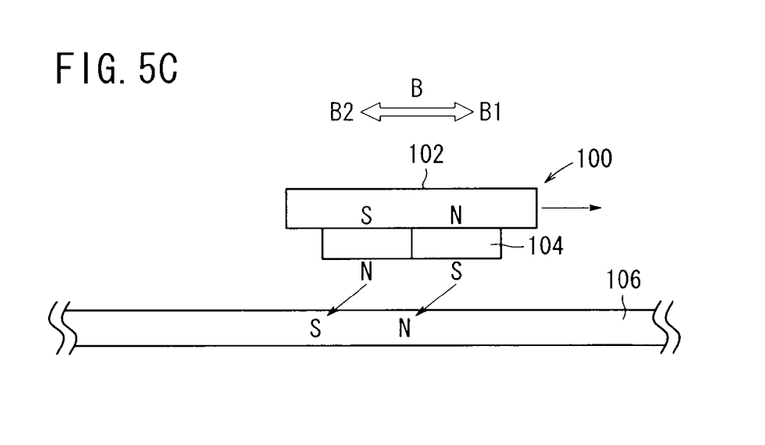

FIGS. 5A to 5C are schematic views for explaining the principles by which braking forces are generated that impede the thrust force of the slide table 46. A movable section 100 includes a magnetizable material body 102 and permanent magnets 104. The permanent magnets 104 are arranged in confronting relation to another magnetizable material body 106. The movable section 100 is moved in the directions of the arrow B (i.e., directions B1 and B2) above the magnetizable material body 106.

FIG. 5A shows magnetic poles, which are generated in the magnetizable material body 106 when the movable section 100 is stopped. When the movable section 100 is stopped, the magnetizable material body 106 becomes magnetized by the permanent magnets 104 and magnetic poles are generated in portions of the magnetizable material body 106 that correspond to the permanent magnets 104. More specifically, a south pole (S-pole) is magnetized in a region of the magnetizable material body 106 that confronts a north pole (N-pole) region of the permanent magnets 104, whereas a north pole (N-pole) is magnetized in a region of the magnetizable material body 106 that confronts a south pole (S-pole) region of the permanent magnets 104.

FIG. 5B shows magnetic poles generated in the magnetizable material body 106 by movement of the movable section 100 in the direction of the arrow B1, in a case where the coercive force of the magnetizable material body 106 is small (i.e., the magnetizable material body 106 exhibits a low coercive force). Accompanying movement of the movable section 100, the magnetic poles in the magnetizable material body 106 also move. The arrows in FIG. 5B extending from the permanent magnets 104 to the magnetizable material body 106 indicate the magnetic force, which is generated by the permanent magnets 104 and the magnetizable material body 106. In the case that the coercive force of the magnetizable material body 106 is small in this manner, since the generated magnetic force is substantially perpendicular to the movement direction of the movable section 100, it is difficult for forces to be generated in a horizontal direction.

FIG. 5C shows magnetic poles generated in the magnetizable material body 106 by movement of the movable section 100 in the direction of the arrow B1, in a case where the coercive force of the magnetizable material body 106 is high (i.e., the magnetizable material body 106 exhibits a high coercive force). In this case, even if the movable section 100 moves, the magnetized condition of the magnetizable material body 106, which was magnetized prior to movement, remains (i.e., residual magnetization exists), and magnetic poles in the magnetized regions tend to remain therein. As a result of such residual magnetization, the magnetic force, which is generated by the permanent magnets 104 and the magnetizable material body 106, works at an inclined direction with respect to the direction of movement of the movable section 100, and forces (braking forces) are generated in a direction opposite to the movement direction of the movable section 100. Consequently, while it would be preferable if the magnetizable material body 106 were a magnetizable material that exhibits a small coercive force, a certain level of strength and structural integrity are necessary for the guide rail 20 and the slide table 46. Hence, because the guide rail 20 and the slide table 46 are subjected to hardening by heat treatment, they become magnetizable materials that exhibit a large coercive force.

Consequently, in the present invention, as described above, by providing a low coercive force magnetizable material body 36, which exhibits a coercive force smaller than the coercive force of the guide rail 20, between the permanent magnets 16a, 16b and the guide rail 20, generation of residual magnetization can be suppressed. As a result thereof, generation of braking forces also can be suppressed. Stated otherwise, if the low coercive force magnetizable material body 36 is disposed between the coil 12 and the guide rail 20, as a result of the low coercive force magnetizable material body 36, it becomes harder for the guide rail 20 to be magnetized. In this case, although the low coercive force magnetizable material body 36 becomes magnetized by the permanent magnets 16a, 16b, residual magnetization either is not generated or development of residual magnetization in the low coercive force magnetizable material body 36 is small, and hence generation of braking forces can be suppressed.

Figure 6:
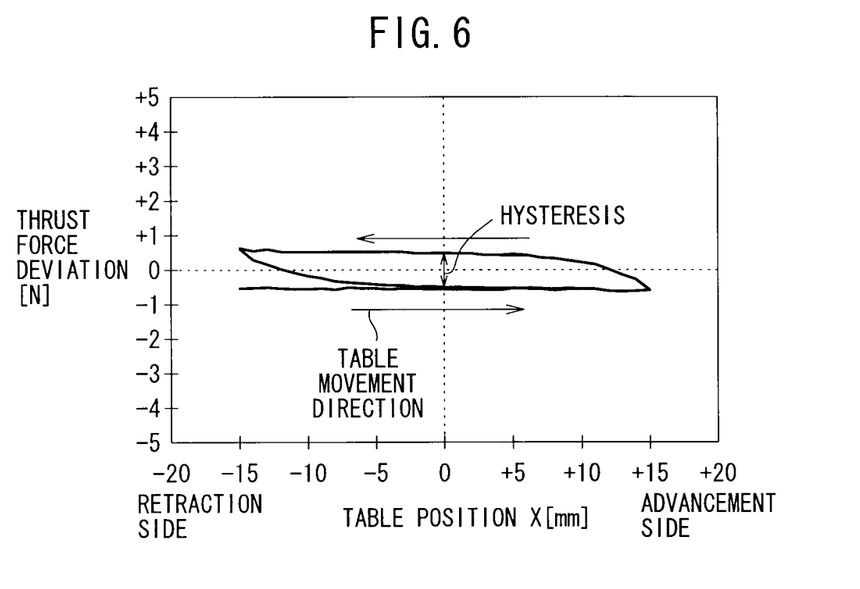
FIG. 6 is a diagram showing the relationship between the position and movement direction of a slide table and deviation in thrust force of the slide table, for a case in which a low coercive force magnetizable material body is not disposed between a guide rail and a coil.

FIG. 6 is a diagram showing the relationship between the position and movement direction of the slide table 46 and deviation in thrust force of the slide table 46, for a case in which the low coercive force magnetizable material body 36 is not disposed between the guide rail 20 and the coil 12. The horizontal axis indicates the position of the slide table 46, the positive (+) direction indicates a direction (advancement direction) beyond a standard reference position, whereas the negative (−) direction indicates a direction (retraction direction) beyond the standard reference position. Further, the vertical axis indicates the deviation in thrust force of the slide table 46. This deviation is shown as a difference between a thrust force of the slide table 46 when affected by the influence of residual magnetization, and a thrust force (standard thrust force) of the slide table 46 for a case in which the thrust force is unaffected by the influence of residual magnetization.

As shown in FIG. 6, the braking force is enlarged and hysteresis is brought about by residual magnetization of the guide rail 20. As a result thereof, proper positioning of the slide table 46 is difficult to achieve, and alignment accuracy of the slide table 46 is deteriorated.

Figure 7:
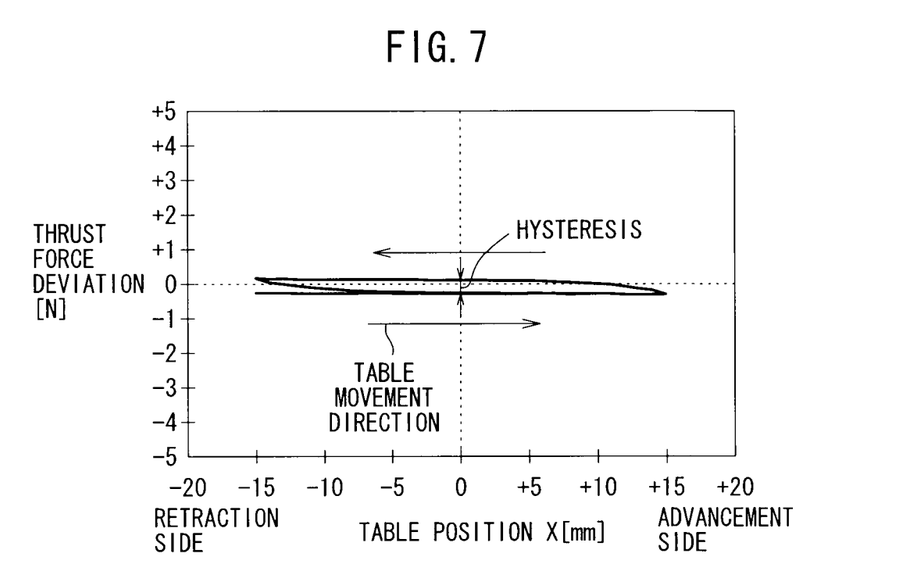
FIG. 7 is a diagram showing the relationship between the position and movement direction of the slide table and deviation in thrust force of the slide table, for a case in which a low coercive force magnetizable material body having a constant thickness (e.g., 0.5 mm) is disposed between the guide rail and the coil.

FIG. 7 is a diagram showing the relationship between the position and movement direction of the slide table 46 and deviation in thrust force of the slide table 46, for a case in which a low coercive force magnetizable material body 36 having a constant thickness (e.g., 0.5 mm) is disposed between the guide rail 20 and the coil 12. The vertical and horizontal axes in FIG. 7 are the same as those in FIG. 6. As easily understood from FIG. 7, when the low coercive force magnetizable material body 36 is disposed between the guide rail 20 and the permanent magnets 16a, 16b, in comparison with FIG. 6, hysteresis is made smaller. However, in this case, even though the low coercive force magnetizable material body 36 is provided, hysteresis is not completely eliminated. As reasons to explain this phenomenon, even in the presence of the low coercive force magnetizable material body 36 and merely by the low coercive force thereof, some degree of residual magnetization still tends to be generated. Further, a small amount of residual magnetization also is generated in the guide rail 20.

Figure 8:
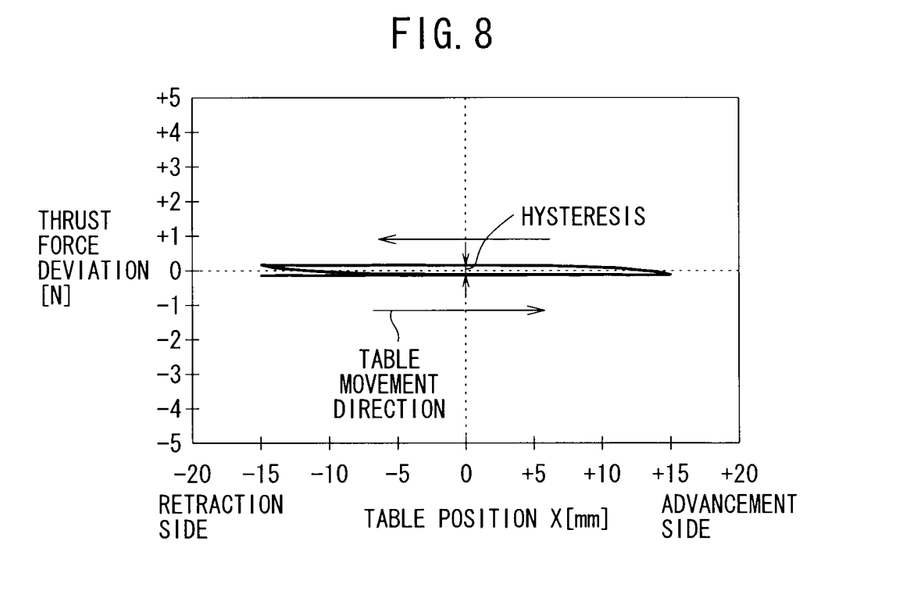
FIG. 8 is a diagram showing the relationship between the position and movement direction of the slide table and deviation in thrust force of the slide table, for a case in which two low coercive force magnetizable material bodies of the type shown in FIG. 7 are stacked and the two low coercive force magnetizable material bodies are disposed between the guide rail and the coil.

FIG. 8 is a diagram showing the relationship between the position and movement direction of the slide table 46 and deviation in thrust force of the slide table 46, for a case in which two low coercive force magnetizable material bodies 36 of the type shown in FIG. 7 are stacked and the two low coercive force magnetizable material bodies 36 are disposed between the guide rail 20 and the coil 12. The vertical and horizontal axes in FIG. 8 are the same as those in FIG. 6. As easily understood from FIG. 8, when two stacked low coercive force magnetizable material bodies 36 are disposed between the guide rail 20 and the permanent magnets 16a, 16b, in comparison with FIG. 7, the effect of hysteresis becomes even smaller. This is because residual magnetization generated in the low coercive force magnetizable material bodies 36 and the guide rail 20 is even smaller compared to the case of FIG. 7.

In the forgoing manner, when the low coercive force magnetizable material body 36 is disposed between the permanent magnets 16a, 16b and the guide rail 20, and the thickness thereof is made comparatively thick, residual magnetization generated in the guide rail 20 and the low coercive force magnetizable material body 36 can further be made smaller, such that the thrust force of the slide table 46 approaches the standard thrust force. Further, even without providing two stacked low coercive force magnetizable material bodies 36 of the type shown in FIG. 7, if a single layer low coercive force magnetizable material body 36 having a thickness of 1.00 mm is provided, the same effects as those shown in FIG. 8 can be obtained.

Figure 9:
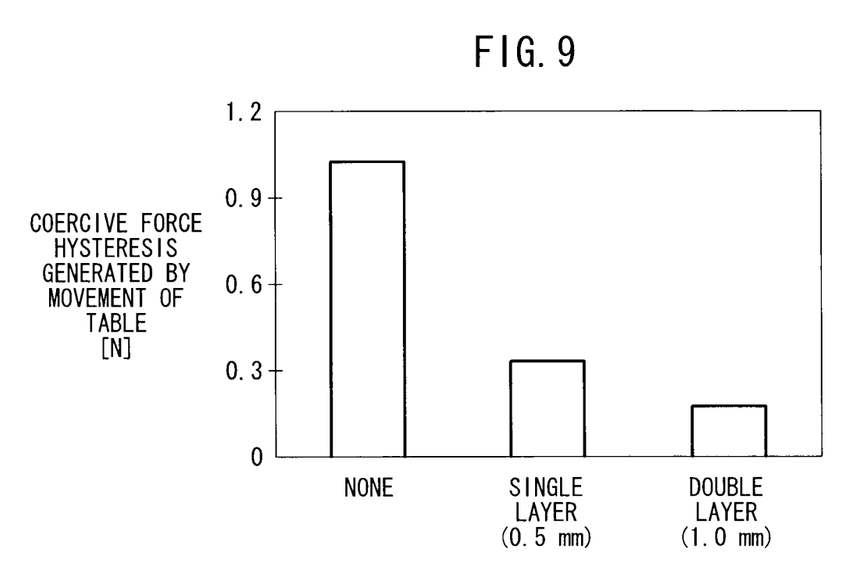
FIG. 9 is a diagram showing hysteresis in the thrust force due to movement of the slide table for the respective cases of FIGS. 6 through 8.

FIG. 9 is a diagram showing hysteresis in the thrust force due to movement of the slide table 46 for the respective cases of FIGS. 6 through 8. Hysteresis generated in the case that the low coercive force magnetizable material body 36 is not provided is more than three times greater compared to the case shown in FIG. 7, in which the low coercive force magnetizable material body 36 is provided. Further, when two layers of the low coercive force magnetizable material body 36 shown in FIG. 7 are stacked, it is understood that hysteresis is made approximately ½ smaller compared to the case of providing only one layer of the low coercive force magnetizable material body 36. The thickness of the low coercive force magnetizable material body 36 can be changed or varied depending on an allowable hysteresis value that can be tolerated.

In this manner, by providing the low coercive force magnetizable material body 36 between the guide rail 20 and the permanent magnets 16a, 16b, residual magnetization that tends to be generated in the guide rail 20 and the low coercive force magnetizable material body 36 can be suppressed. Since residual magnetization can be suppressed, a linear electromagnetic actuator 10 can be provided, in which any influence on the thrust force of the movable section 18 caused by such residual magnetization can also be suppressed, the slide table 46 can be moved accurately, and precision in positioning of the slide table 46 can be enhanced.

The embodiment of the present invention described above may be modified in the following ways:

Modified Example 1

In the aforementioned embodiment, the coil 12 is disposed on the guide rail 20 of the fixed section 14, and the permanent magnets 16a, 16b are disposed on the slide table 46 of the movable section 18. However, the permanent magnets 16a, 16b may be disposed on the guide rail 20 of the fixed section 14, and the coil 12 may be disposed on the slide table 46 of the movable section 18. In such a case, the low coercive force magnetizable material body 36 is disposed between the coil 12 and the slide table 46.

Modified Example 2

In the aforementioned embodiment, in order to suppress generation of braking forces that impede the thrust force of the slide table 46, the low coercive force magnetizable material body 36 is disposed between the guide rail 20 and the coil 12. However, it is acceptable if the low coercive force magnetizable material body 36 is not provided. In this case, over the guide rail 20, heat treatment is implemented on surface portions thereof apart from those that confront the permanent magnets 16a, 16b. Stated otherwise, over the guide rail 20, heat treatment is not implemented on surface portions thereof that confront the permanent magnets 16a, 16b, whereas heat treatment is implemented with respect to regions apart therefrom (i.e., on the projections 28a and 28b).

Figure 10:
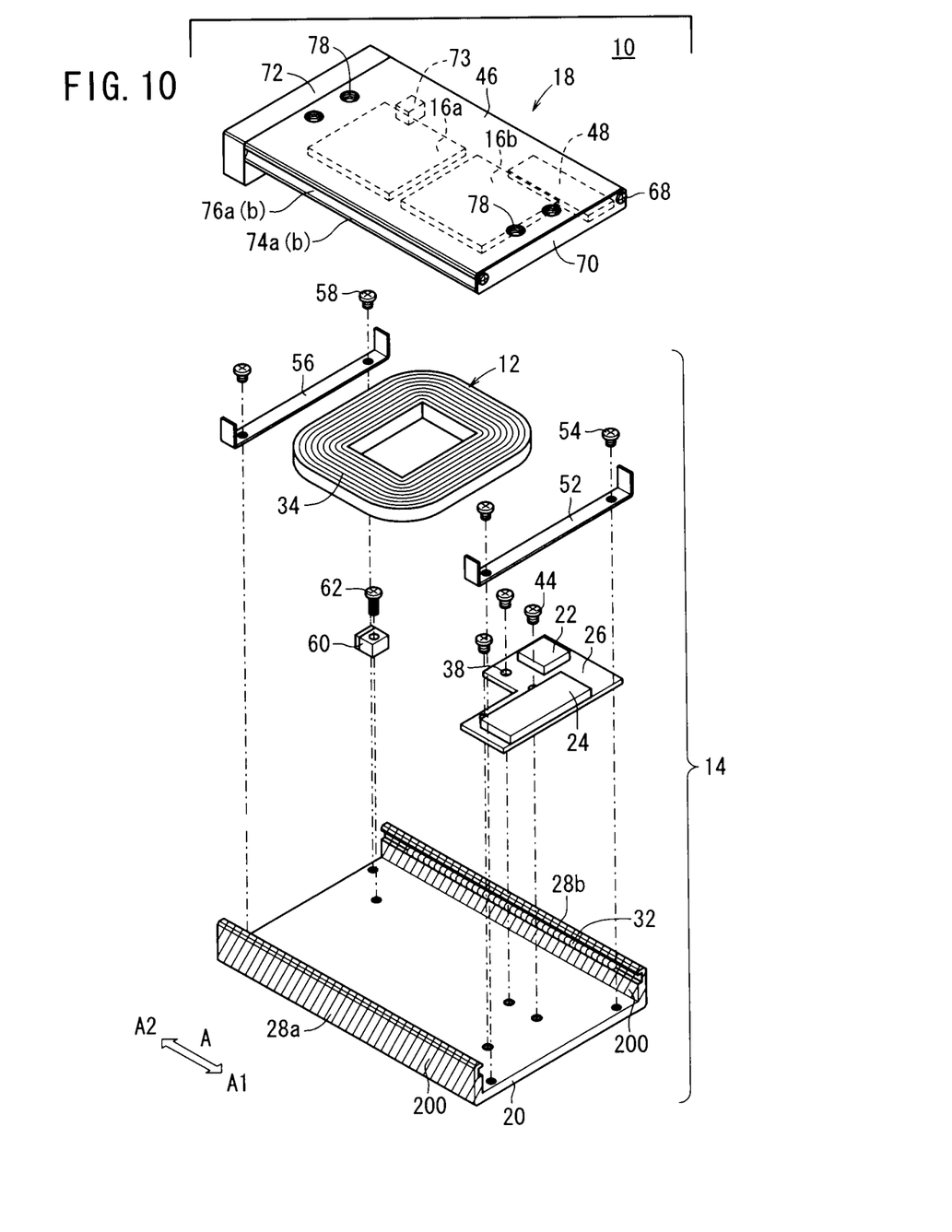
FIG. 10 is a perspective view of a linear electromagnetic actuator according to a second modified example, in which the view shows an example of a region on the guide rail (shown in hatching) where heat treatment is implemented.

FIG. 10 is a perspective view of a linear electromagnetic actuator 10 according to a second modified example, in which the view shows an example of regions (shown in hatching) where heat treatment is implemented on the guide rail 20. The regions 200 shown in hatching indicate regions, over the guide rail 20, where heat treatment is implemented thereon. In other words, other regions apart from the regions 200 (i.e., regions where hatching is not shown) indicate regions where heat treatment is not implemented.

Because the projections 28a, 28b carry out a role as guides to enable movement of the slide table 46 in the direction of the arrow A, it is preferable for the projections 28a, 28b to be hard. On the other hand, on surface portions of the guide rail 20 that confront the permanent magnets 16a, 16b, in contrast to the projections 28a, 28b, there is no requirement for such surface portions to be hardened. Accordingly, heat treatment is implemented only with respect to regions (i.e., the projections 28a, 28b) apart from surface portions of the guide rail 20 that confront the permanent magnets 16a, 16b. Since heat treatment is not implemented on surface portions of the guide rail 20 that confront the permanent magnets 16a, 16b, the coercive force within such portions does not become high. Owing thereto, even if the low coercive force magnetizable material body 36 is not provided between the guide rail 20 and the coil 12, residual magnetization generated in the guide rail 20 can be suppressed, and generation of braking forces that could otherwise impede the thrust force of the slide table 46 can also be suppressed.

Further, together with not implementing heat treatment with respect to surface portions of the guide rail 20 that confront the permanent magnets 16a, 16b, while implementing heat treatment with respect to other regions apart from those surface portions that confront the permanent magnets 16a, 16b, the low coercive force magnetizable material body 36 may still be provided between the guide rail 20 and the coil 12. In accordance therewith, residual magnetization can be even further suppressed, and generation of braking forces that could otherwise impede the thrust force of the slide table 46 can also be suppressed more fully.

Modified Example 3

In the above modified example 2, over the guide rail 20, heat treatment is not implemented on surface portions that confront the permanent magnets 16a, 16b, however, among those surface portions that confront the permanent magnets 16a, 16b, it is acceptable if heat treatment is not implemented at least on regions thereof that are magnetized by the permanent magnets 16a, 16b. In other words, even though surface portions may exist that confront the permanent magnets 16a, 16b, so long as such surface portions are apart from regions that actually are magnetized by the permanent magnets 16a, 16b, heat treatment may be implemented thereon.

Figure 11:
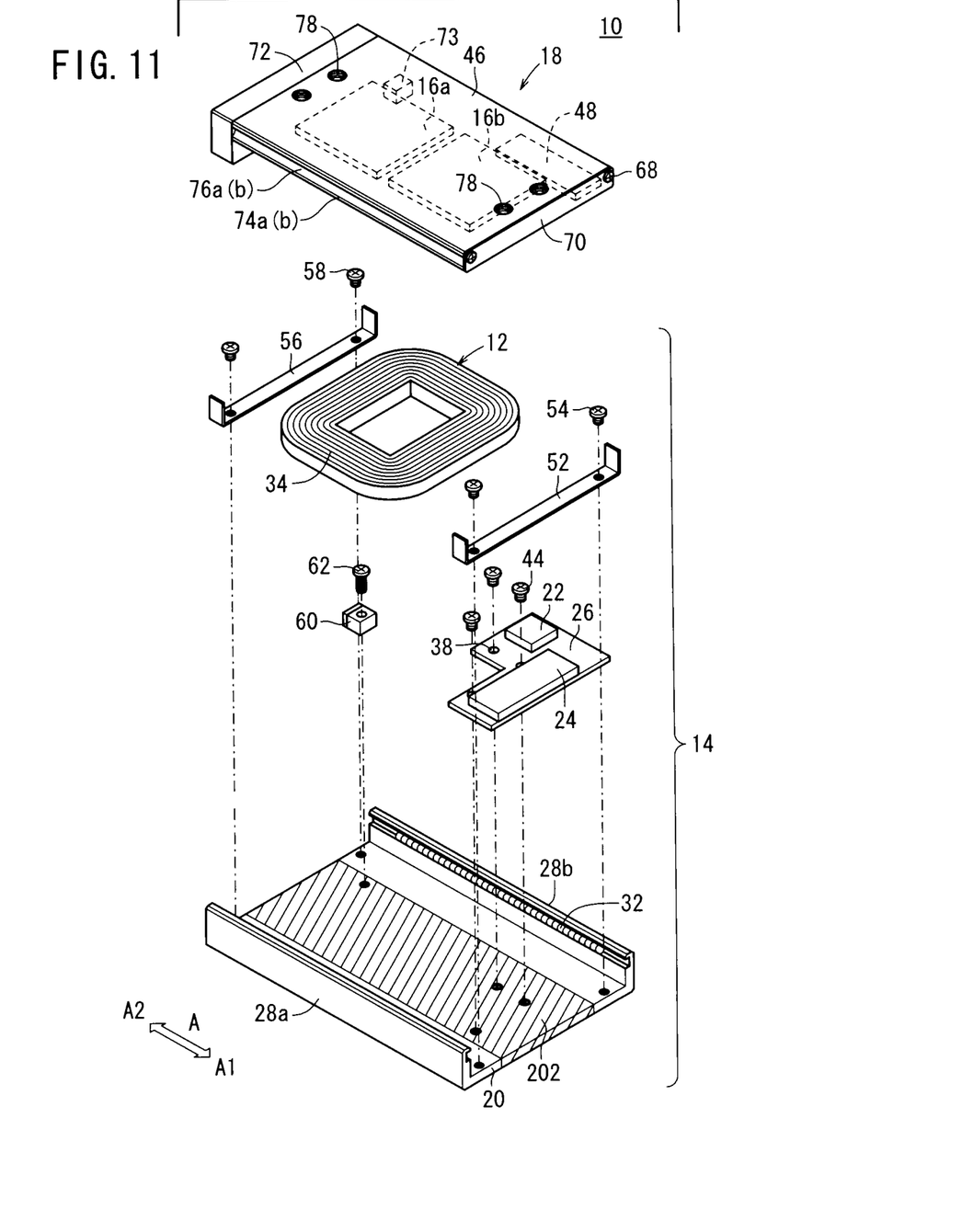
FIG. 11 is a perspective view of a linear electromagnetic actuator according to a third modified example, in which the view shows an example of a region on the guide rail (shown in hatching) that is magnetized by permanent magnets.

FIG. 11 is an exploded perspective view of a linear electromagnetic actuator 10 according to a third modified example, in which the view shows an example of a region 202 on the guide rail 20 (shown in hatching) that is subject to being magnetized by the permanent magnets 16a, 16b. More particularly, if heat treatment were implemented with respect to the region 202, it would become easy for residual magnetization to be generated by the permanent magnets 16a, 16b, and the influence of such residual magnetization on the thrust force of the movable section 18 would be pronounced. Therefore, heat treatment should not be implemented at least with respect to the region 202.

Further, among surface portions of the guide rail 20 that face the permanent magnets 16a, 16b, it is acceptable if heat treatment is not implemented at least with respect to regions that directly confront the permanent magnets 16a, 16b. Further, among surface portions of the guide rail 20 that face the permanent magnets 16a, 16b, it is acceptable if, in addition to not implementing heat treatment with respect to regions that are magnetized by the permanent magnets 16a, 16b, or with respect to regions that directly confront the permanent magnets 16a, 16b, the low coercive force magnetizable material body 36 still is provided between the guide rail 20 and the coil 12. In accordance therewith, residual magnetization can be even further suppressed, and generation of braking forces that could otherwise impede the thrust force of the slide table 46 can also be suppressed more fully.

Modified Example 4

In the above embodiments, explanations have been given using a card type of linear electromagnetic actuator 10 (i.e., a linear electromagnetic actuator with a thin flat profile). However, it goes without saying that the invention is not limited solely to card type linear electromagnetic actuators. Further, although the invention has been explained with reference to a linear electromagnetic actuator 10, the invention is not limited to a linear electromagnetic actuator per se, but may also be applied to other (non-linear) types of electromagnetic actuators.

Modified Example 5

So that adjacent balls 32 do not come into contact with each other in spaces formed by the guide grooves 30a, 30b of the projections 28a and 28b and the guide grooves 76a, 76b of the projections 74a and 74b of the above embodiments, a retaining device for retaining the balls 32 may be provided. By such a retaining device, friction between the balls 32 themselves is avoided, and falling out of balls 32 from the guide grooves 30a, 30b, 76a, 76b can be avoided. Such a retaining device may comprise a plate having multiple holes formed therein along the longitudinal direction, with the balls 32 being fitted respectively into the holes of the retaining device.

Further, the retaining device may include a filament and a plurality of low friction plates with holes opened in the centers thereof, and wherein holes also are provided in the centers of the balls 32. Such plates are arranged between each of the balls 32, and by passing the filament through the holes in each of the balls 32 and the plates, the retaining device is capable of retaining a plurality of balls 32 such that the balls 32 do not come into contact with each other.

Modified Example 6

Features of the aforementioned modified examples 1 to 5 may be arbitrarily combined with each other to result in other embodiments.

It is a matter of course that the linear electromagnetic actuator 10 according to the present invention is not limited to the embodiments described above. The linear electromagnetic actuator may be embodied in other various modified or improved forms, which would be readily apparent to those skilled in the art, without deviating from the gist or essential characteristics of the present invention. It is understood that such modifications and improvements are included within the technical scope of the present invention, as set forth in the appended claims.

What is claimed is:
1. An electromagnetic actuator, comprising:
a first yoke supporting a permanent magnet; and
a second yoke supporting a coil arranged to confront the permanent magnet,
wherein a relative positional displacement between the first yoke supporting the permanent magnet and the second yoke supporting the coil, is caused by means of a thrust force,
wherein the thrust force is generated due to a current that flows through the coil,
wherein the coil is disposed on the second yoke through a low coercive force magnetizable material body,
wherein the coercive force of the magnetizable material body is lower than a coercive force of the second yoke, and
the low coercive force magnetizable material body is arranged on a surface of the second yoke that confronts the permanent magnet.
2. The electromagnetic actuator according to claim 1, wherein:

a first projection and a second projection are formed on opposite end sides of the second yoke facing toward the first yoke and projecting along a displacement direction, and the first yoke is disposed between the first projection and the second projection.

3. The electromagnetic actuator according to claim 1, wherein:

a third projection and a fourth projection are formed on opposite end sides of the first yoke facing toward the second yoke and projecting along a displacement direction, the third projection and the fourth projection are separated from the second yoke, a first guide member is interposed between the third projection and the second yoke, and a second guide member is interposed between the fourth projection and the second yoke.

4. The electromagnetic actuator according to claim 3, wherein:

a first projection and a second projection are formed on opposite end sides of the second yoke facing toward the first yoke and projecting along the third projection and the fourth projection, the first guide member is interposed between the first projection and the third projection, and the second guide member is interposed between the second projection and the fourth projection.

5. The electromagnetic actuator according to claim 1, wherein:

the first yoke and the second yoke are arranged in confronting relation to each other;

the permanent magnet is positioned on a side of the first yoke that faces the second yoke; and the coil is positioned on a side of the second yoke that faces the first yoke.

6. The electromagnetic actuator according to claim 1, wherein the coil comprises an open center coil formed by an insulating material.

7. The electromagnetic actuator according to claim 2, wherein at least one of the first yoke, and the first projection and the second projection of the second yoke is subjected to heat treatment in order to impart hardness thereto.

8. The electromagnetic actuator according to claim 1, wherein on the surface of the second yoke that confronts the permanent magnet, at least a region thereof that is magnetized by the permanent magnet comprises a region on which heat treatment to impart hardness is not implemented.

9. The electromagnet actuator according to claim 1, wherein the low coercive force magnetizable material body comprises at least one of pure iron, magnetic steel, low-carbon steel, a cobalt alloy, and an amorphous alloy.

10. The electromagnetic actuator according to claim 1, wherein the low coercive force magnetizable material body is formed in a plate-like shape.

11. The electromagnetic actuator according to claim 10, wherein a thickness of the low coercive force magnetizable material body is determined corresponding to an allowable hysteresis value.

* * * * *